United States Patent
Mitsunaga et al.

(10) Patent No.: US 6,403,697 B1
(45) Date of Patent: Jun. 11, 2002

(54) CARBON BLACK, METHOD FOR ITS PREPARATION AND ITS APPLICATIONS

(75) Inventors: Toshikatsu Mitsunaga; Yoshiteru Yamasaki; Hiroyuki Hara; Kazuyoshi Tsuruta, all of Fukuoka (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,317

(22) Filed: Mar. 24, 2000

(30) Foreign Application Priority Data

Mar. 29, 1999 (JP) .......... 11-086661
Oct. 4, 1999 (JP) .......... 11-282919

(51) Int. Cl.$^7$ .............. C08J 3/40; H01B 1/04
(52) U.S. Cl. .......... 524/495; 524/496; 252/502; 252/503; 252/511; 252/570.22
(58) Field of Search ............ 524/495, 496; 252/502, 510, 511

(56) References Cited

U.S. PATENT DOCUMENTS 4,702,860 A * 10/1987 Kinderov et al. .......... 252/511
5,294,373 A * 3/1994 Takahashi et al. .......... 252/502

FOREIGN PATENT DOCUMENTS

DE 34 21 933 12/1985

* cited by examiner

*Primary Examiner*—Edward J. Cain
*Assistant Examiner*—Katarzyna W. Lee
(74) *Attorney, Agent, or Firm*—Oblon, Spivak, McClelland, Maier & Neustadt, P.C.

(57) ABSTRACT

Carbon black having boron solid-solubilized therein, which has an electrical resistivity of not higher than 0.1 Ωcm, as measured in accordance with JIS K1469.

15 Claims, No Drawings

CARBON BLACK, METHOD FOR ITS PREPARATION AND ITS APPLICATIONS

The present invention relates to carbon black having boron solid-solubilized therein, a method for its preparation and its applications i.e. an electrically conductive composition, a resin composition for a cable, a communication cable and a power cable.

Heretofore, it has been common to incorporate an electrically conductive material such as carbon black to a rubber, a resin or a coating material. As such carbon black, one having a large specific surface area or one having the structure developed, has been preferably employed in order to impart higher electrical conductivity. As an example for application of a conductive resin composition among such conductive compositions, a protective material for a communication cable or a semiconductor layer for a power cable may be mentioned.

A communication cable comprises, as the basic structure, a conductor (such as cupper or aluminum) for conducting communication signals, an insulator (such as a vinyl chloride resin, an ethylene type resin such as cross linked polyethylene, or paper) for preventing short circuiting of conductors, and a protective material (such as lead, an ethylene type resin, a vinyl chloride resin or a polychloroprene rubber) for protecting a collected cable conductor, and it is used, for example, as a city cable, a toll cable, an optical fiber cable, a coaxial cable or a submarine cable.

On the other hand, a power cable comprises, as the basic structure, a conductor (such as cupper or aluminum) for conducting an electric power, an inner semiconductor layer (such as a carbon black-containing ethylene/vinyl acetate copolymer resin) for field relaxation, an insulating layer (such as cross-linked polyethylene or ethylene propylene rubber), an outer semiconductor layer (such as a carbon black-containing ethylene/vinyl acetate copolymer resin) for field relaxation, a shielding layer (such as a cupper tape) and a protective material (such as a vinyl chloride resin) for protecting the cable, and it is used, for example, as a CV cable (cross-linked polyethylene insulated vinyl sheath cable) such as a single core CV cable, a three core CV cable or a triplex CV cable, or a PN cable. Further, there is a power cable having a structure such that a cloth tape is interposed between the shielding layer and the protective material.

Such a communication cable or a power cable (hereinafter sometimes generally referred to simply as "a able") is widely used, as the maintenance control is easy. However, one of problems to be solved is how to further improve the flexibility.

A protective material for a communication cable is required to have functions to protect the interior of the cable from damage by an external mechanical factor, to prevent humidity in air from reaching to. the insulating layer, to provide a return circuit for a fault current and to shield disturbance due to external electromagnetic waves. Likewise, a protective material for a power cable is required to have, in addition to the above functions of the protective layer for a communication cable, a function to shield induction electromagnetic waves generated by a high voltage current against the exterior. Such electromagnetic wave-shielding effects are closely related to electrical conductivity. Namely, if the electrical conductivity is improved, the electromagnetic wave-shielding effect will also be improved. Therefore, at present, as a protective material, a combination of a metal sheath and a corrosion preventive material made of a resin composition, is employed. As a: resin for such a resin composition, chloroprene rubber, a vinyl chloride resin or polyethylene is, for example, used. Especially for a small-size cable, flexibility is desired to increase the degree of freedom in wiring. Accordingly, use of a resin composition having carbon black loaded, is increasing, and it is presently desired to develop an inexpensive and highly conductive resin composition for the protective material.

On the other hand, an internal semiconductor layer and an external semiconductor layer of a power cable are made of a molded product having carbon black incorporated to an ethylene type copolymer resin such as an ethylene/vinyl acetate copolymer, an ethylene/ethyl acrylate copolymer or an ethylene/butyl acrylate copolymer, having the content of a copolymer component such as vinyl acetate, ethyl acrylate or butyl acrylate increased to a level of at least 20%, in order to improve the field relaxation between the adjacent conductor and insulating layer or to improve the field relaxation between the insulating layer and the metal sheath of the protective material. However, such a copolymer component is expensive, and the cost of resin may increase. Accordingly, it is desired to develop a semiconductor layer made of an ethylene type copolymer resin having a small content of such a copolymer component and having high fluidity and high electrical conductivity.

The present inventors have attempted to satisfy the above demand by increasing the loading amount of carbon black to an ethylene type copolymer resin, but if the loading amount is increased to such a level at which the desired electrical conductivity can be achieved, the flexibility of the obtained molded product tends to remarkably deteriorate, and the object cannot be accomplished. The carbon black used here was a conventional product (commercial product). For a high voltage or super high voltage CV cable semiconductor layer with a working voltage being at least 33 KV, acetylene black having an iodine adsorption number of from 85 to 100 mg/g was used from the viewpoint of adhesion and high purity. For a CV cable semiconductor layer with a working voltage of less than 33 KV, furnace black was used to facilitate peeling of the resin at the time of application. Further, as a protective material, a molded product having furnace black loaded to a low density polyethylene (LDPE: low-density polyethylene), was used.

When ketchen black capable of imparting high electrical conductivity with a small loading amount, is used instead of furnace black, the electrical conductivity was improved by a high specific surface area, but the tendency for flexibility was the same as a conventional product, and thus the flexibility was not sufficient although high conductivity was obtained. Rather, high loading of ketchen black tended to increase adsorbed water because of the high specific surface area, thus leading to a problem such as deterioration of the resin composition or the resin molded product.

As described above, if carbon black having a high specific surface area such as ketchen black which used to e employed to provide high electrical conductivity, is incorporated to a rubber, a resin or a coating material, the viscosity tends to remarkably increase, and the operation efficiency during mixing or the handling efficiency tends to deteriorate. Therefore, there has been a limitation in improving the electrical conductivity by increasing the loading amount.

The present invention has been made in view of the above problems, and it is an object of the present invention to provide carbon black which has a large conductivity-imparting effect and which does not increase the viscosity like conventional high specific surface area carbon black even if incorporated in a large amount to a rubber, a resin or a coating material, a method for its preparation and its applications i.e. an electrically conductive composition, a resin composition for a cable, a communication cable and a power cable.

Namely, the present invention provides:

Carbon black having boron solid-solubilized therein, which has an electrical resistivity of not higher than 0.1 Ωcm, as measured in accordance with JIS K1469. Preferably, the amount of boron solid-solubilized, is from 0.6 to 3.0 wt %.

A method for preparing boron solid-solubilized carbon black, which comprises a thermal decomposition reaction and/or a combustion reaction of a hydrocarbon, wherein the thermal decomposition reaction and/or the combustion reaction is carried out in the presence of a boron source. It is particularly preferred that the hydrocarbon is acetylene, and the boron source is an organic boron compound.

Further, the present invention provides an electrically conductive composition having the above carbon black incorporated in a resin, a rubber or a coating material, particularly a resin composition for a cable, comprising an ethylene type copolymer resin and the above-mentioned carbon black.

Furthermore, the present invention provides a communication cable comprising a conductor, an insulator and a protective material, wherein the protective material is made of a molded product of the above-mentioned resin composition, and a power cable comprising a conductor, an inner semiconductor layer, an insulating layer, an outer semiconductor layer, a shielding layer and a protective material, wherein the inner semiconductor layer, the outer semiconductor layer and/or the protective layer is made of a molded product of the above-mentioned resin composition.

Now, the present invention will be described in further detail with reference to the preferred embodiments.

The carbon black of the present invention is carbon black having boron solid-solubilized therein, which has an electric resistivity of not higher than 0.1 Ωcm, as measured by JIS K1469. If the electrical resistivity is higher than 0.1 Ωcm, the effect for imparting electrical conductivity tends to be small even if it is incorporated to a resin, a rubber or a coating material.

The high electrical conductivity of the carbon black of the present invention is accomplished by solid-solubilizing boron to carbon black. The amount of boron solid-solubilized, is preferably from 0.6 to 3.0 wt %. If the amount solid-solubilized is outside this range, it tends to be difficult to sufficiently increase the effect for imparting electrical conductivity.

The amount of boron solid-solubilized in the present invention can be obtained by subtracting the amount of soluble boron from the entire amount of boron measured as follows. For the entire amount of boron, 0.5 g of carbon black is taken in a platinum dish, and 20 ml of a 1.5 wt % $Ca(OH)_2$ solution and 5 ml of acetone are added, and the mixture is dispersed for one hour in an ultrasonic wave cleaner. The dispersed mixture is heated to dryness in a sand bath and then ashed in an electric furnace at 800° C. over a period of 3 hours in an oxygen stream. Then, 10 ml of an HCl(1+1) solution is added thereto, followed by heating in a sand bath for elution. The eluted liquid is adjusted to 100 ml, and the amount of boron is quantitatively analyzed by ICP-AES to obtain the entire amount of boron in the carbon black.

For the amount of soluble boron, 1 g of carbon black is taken into an Erlenmeyer flask made of quartz glass, and 100 ml of water and 1 ml of acetone are added thereto. The mixture is refluxed in a water bath for 24 hours and then subjected to filtration with a 0.1 μm membrane filter. The amount of boron in the filtrate is quantitatively analyzed by ICP-AES to obtain the amount of soluble boron in the carbon black.

The boron solid-solubilized carbon black in the present invention is such that according to the ESR (electron spin resonance) analysis, the spin representing an unpaired electron increases in proportion to the amount of the boron solid-solubilized. This is a phenomenon not observed with conventional boron-incorporated carbon black (JP-B-2-16933).

JP-B-2-16933 discloses carbon black having not higher than 0.5 wt % of boron added, which is prepared by treating carbon black with a 5% aqueous solution of borax or boric acid, drying it at a temperature of from 110 to 120° C., followed by heat treatment in a weakly reducing medium at a temperature of from 2000 to 2500° C. However, with this carbon black, the electrical resistivity would not be not higher than 0.10 Ωcm as measured by JIS K1469. Further, the method for adding boron is by post treatment after formation of carbon black, which is different from the present invention.

The reason for the high electrical conductivity of the boron solid-solubilized carbon black of the present invention, is not clearly understood. However, it is considered that as boron has been taken into carbon black, the lattice plane has been broadened, whereby the π electron density has decreased and free electrons have increased, or the Fermi level has lowered, and the Hall effect has been created.

The mechanism for imparting high electrical conductivity of the present invention, is based on solid-solubilization of boron. Accordingly, in the present invention, any carbon black such as thermal black, furnace black, lamp black, channel black, roll black, disk black, graphite black or acetylene black, having boron solid-solubilized therein, may be employed.

The specific surface area of the boron solid-solubilized carbon black of the present invention is preferably from 20 to 110 $m^2/g$, and its iodine adsorption value is preferably from 30 to 80 mg/g.

The boron solid-solubilized carbon black of the present invention can be produced by carrying out a thermal decomposition reaction and/or a combustion reaction of a hydrocarbon in the presence of a boron source. According to the method for the preparation of the present invention, the reaction and/or combustion of a hydrocarbon proceeds instantaneously, whereby the boron solid-solubilized carbon black can easily be prepared. Yet, the amount of boron solid-solubilized can be substantially increased as compared with a method of post incorporation to formed carbon black. A method for supplying the boron source to the hydrocarbon may be a method wherein it is preliminarily mixed with the hydrocarbon gas, or a method wherein the boron source is supplied by a separate line to the region where the hydrocarbon undergoes thermal decomposition and/or combustion. For the method for preparing boron solid-solubilized carbon black according to the present invention, a conventional apparatus for preparing carbon black can be used, and such is advantageous from the viewpoint of the production cost.

The hydrocarbon to be used in the present invention may be a hydrocarbon in the form of a gas or oil. It is particularly preferred to employ acetylene gas, as the resulting heat quantity will be large, and the reaction temperature will be high.

The boron source to be used in the present invention is a substance containing boron, such as boron, boric acid, boron trifluoride, boron trichloride, boron tribromide, boron triiodide, diboron trisulfide, boron nitride, borazine, boron phosphate, boron carbide, boron silicide, triethyl borate, trimethyl borate, diborane, tetraborane, pentaborane, hexaborane, decaborane, triethyl borane, tributyl borane, triphenyl borane, chlorodiethyl borane, diclorophenyl borane or phenyl boric acid. Among them, an organic boron compound is referred, since it can easily be used as vaporized.

Now, the electrically conductive composition of the present invention will be described. The electrically conductive composition of the present invention is one having the boron solid-solubilized carbon black of the present invention incorporated to a resin, a rubber or a coating material.

The rubber to be used in the present invention may, for example, be natural rubber, styrene butadiene rubber, acryl nitrile butadiene rubber, butyl rubber, acrylic rubber, ethylene propylene rubber, ethylene propylene terpolymer, a copolymer rubber of ethylene with an α-olefin, silicone rubber, fluorine rubber, a thermoplastic elastomer such as polyester, chloroprene rubber, polybutadiene, hydrin rubber or chlorosulfonated polyethylene.

The resin or the resin component for a coating material may, for example, be an epoxy resin such as a bisphenol type epoxy resin, a phenol novolac type epoxy resin, a glycidyl ester type epoxy resin, a glycidyl amine type epoxy resin, an alicyclic epoxy resin, a chlorine cyclic epoxy resin or a halogenated epoxy resin, polybenzimidazole, polybenzoxazole, polybenzthiazole, polyoxadiazole, polypyrazole, polyquinoxaline, polyquinazolinedione, polybenzoxadinone, polyindolone, polyquinazolone, polyindoxyl, a silicone resin, a silicone-epoxy resin, a phenol resin, a melamine resin, a urea resin, an unsaturated polyester, polyaminobismaleimide, a diallyl phthalete resin, a fluorine resin, polyimide, polyamidoimide, polyether imide, a polyamide such as amorphous nylon, a polyester such as polybutyl terephthalate or polyethylene terephthalate, polyphenylene sulfide, a modified polyphenylene ether, polyarylate, entirely aromatic polyester, polysulfone, liquid crystal polymer, polyether ether ketone, polyether sulfone, polycarbonate, a maleimide-modified resin, an ABS resin, an AAS (acrylnitryle/acryl rubber/styrene) resin, an AES (acrylnitryle/ethylene propylene diene rubber/styrene) resin, polyethylene, polypropylene, or a copolymer resin such as ethylene/vinyl acetate or ethylene/ethyl acrylate.

The amount of the boron solid-solubilized carbon black to be incorporated, is totally optional. For example, the carbon black is from 5 to 100 parts by weight per 100 parts by weight of the rubber and/or the resin component of the electrically conductive composition.

To the electrically conductive composition of the present invention, various additives such as a surfactant, a plasticizer, a thickener, a binder, and a defoaming agent, may be incorporated.

Now, the resin composition for a cable of the present invention will be described. This invention corresponds to the above-mentioned electrically conductive composition, wherein the resin component is an ethylene type copolymer resin such as an ethylene/vinyl acetate copolymer, an ethylene/ethyl acrylate copolymer or an ethylene/butyl acrylate, containing a copolymer component such as vinyl acetate, ethyl acrylate or butyl acrylate. The proportions of the ethylene type copolymer resin and the carbon black are preferably such that in the case where the application of the resin composition is a protective material for a communication cable, the carbon black is from 5 to 50 parts by weight per 100 parts by weight of the ethylene type copolymer resin. If the carbon black is less than 5 parts by weight, the electrical conductivity effective for the electromagnetic wave-shielding effect tends to hardly obtainable, although the resin kneaded product may exhibit good flexibility (fluidity). On the other hand, if it exceeds parts by weight, the flexibility tends to deteriorate.

On the other hand in a case where the composition is used for a semiconductor layer for a power cable, the carbon black is preferably from 10 to 80 parts by weight per 100 parts by weight of the ethylene type copolymer resin. If the carbon black is less than 10 parts by weight, the electrical conductivity tends to be inadequate, and if it exceeds 80 parts by weight, the flexibility tends to deteriorate.

A conventional method may be employed for the production of the communication cable or the power cable of the present invention using the resin composition for a cable of the present invention. For example, in the case of the power cable, wires may be intertwined to obtain a conductor, and the resin composition for a cable of the present invention to constitute an inner semiconductor layer, a non-crosslinked polyethylene to constitute an insulating layer and the resin composition for a cable of the present invention to constitute an outer semiconductor layer, are coaxially extruded thereon, followed by crosslinking the non-crosslinked polyethylene. Then, a shielding layer and a protective layer made of the resin composition for a cable of the present invention, are formed to obtain a crosslinked polyethylene-insulated power cable.

The basic structure of the communication cable or the power cable to be employed in the present invention, is as described above. In this case, it is not necessary to form all the resin layers such as the inner semiconductor layer, the outer semiconductor layer and the protective material constituting the cable by the resin composition for a cable of the present invention. An example will be described with reference to a CV cable. For example, the inner semiconductor layer is formed by means of the resin composition for a cable of the present invention, but the outer semiconductor layer may be formed by a furnace black-incorporated ethylene/vinyl acetate copolymer resin as a conventional material, or the protective material may be formed by a vinyl chloride resin.

Now, the present invention will be described in further detail with reference to working Examples, Comparative Examples and Reference Examples. However, it should be understood that the present invention is by no means restricted by such specific descriptions. In the Examples, various properties were measured by the following methods.

(1) Amount of boron solid-solubilized: Measured as described above.

(2) Iodine adsorption value: Measured in accordance with JIS K1474.

(3) Specific surface area: Measured by a BET one point method by nitrogen gas adsorption.

(4) DBP absorption: Measured by method B in accordance with JIS K6221.

(5) Electrical resistivity: Measured in accordance with JIS K1469.

(6) Volume resistance of an electrically conductive composition:

30 Mass parts of carbon black and 100 parts by weight of an EVA resin ("NUC-3145", manufactured by Nippon Unicar) were kneaded at a temperature of 120° C. for 10 minutes at a blade rotational speed of 30 rpm by a kneading testing machine ("Laboplastograph R-60", manufactured by Toyo Seiki Seisakusho) having an internal capacity of 60 ml, and the obtained kneaded product was press-molded under a pressure of (9.8 MPa) under heating to a temperature of 180° C. to obtain a test specimen of 2×20×70 mm. The electrical resistance was measured by a digital multi meter ("Digital multi meter 7562", manufactured by Yokogawa Electric corp.).

(7) MFi (melt flow index), of an electrically conductive composition: The test specimen subjected to measurement of the volume resistance was cut into a size of 2×5×5 mm and heated at 200° C. by a fluidity-measuring apparatus ("Melt indexer A-111" manufactured by Toyo Seiki), whereby the mass flowing from a nozzle having an inner diameter of 2 mm under a load of 5 kg, per 10 minutes, was measured.

EXAMPLES 1 TO 3 AND 6, AND COMPARATIVE EXAMPLE 1

Acetylene gas (hydrocarbon) and vaporized trimethyl borate (boron source) were preliminarily mixed before introduction to a nozzle, and then the mixture was sprayed under the conditions as identified in Table 1 from a nozzle disposed at the top of a carbon black production furnace having an entire furnace length of 6 m and a furnace diameter of 1 m, to prepare carbon black by utilizing a thermal decomposition reaction of acetylene. The obtained carbon black was collected by a bug filter, and the above physical properties were measured. The results are shown in Table 2.

EXAMPLE 4

Carbon black was prepared by utilizing an acetylene combustion reaction in accordance with Example 1 except that a gas mixture comprising acetylene gas, trimethyl borate and oxygen gas (combustion-assisting gas) was used. The results are shown in Table 2.

EXAMPLE 5

Carbon black was prepared in the same manner as in Example 2 except that triethyl borate was used instead of trimethyl borate.

REFERENCE EXAMPLE 1

15 g of a carbon black powder having an electrical resistivity of 0.235 Ωcm and 100 g of a 0.4 wt % boric acid aqueous solution were mixed and then dried at a temperature of 110° C. Further, heat treatment was carried out at a temperature of 2100° C. in a nitrogen atmosphere. The physical properties of the obtained carbon black and its conductive composition are shown in Table 2.

REFERENCE EXAMPLE 2

The physical properties of a commercial product of highly electrically conductive furnace black of a high specific surface area type ("Vulcan XC-72", manufactured by Cabot Company) and its electrically conductive composition, are shown in Table 2.

TABLE 1

|  | Flow rate of acetylene ($m^3$/hr) | Flow rate of oxygen ($m^3$/hr) | Amount of trimethyl borate (1/hr) |
|---|---|---|---|
| Example 1 | 140 | 0 | 15 |
| Example 2 | 140 | 0 | 23 |
| Example 3 | 140 | 0 | 46 |
| Example 4 | 117 | 16 | 23 |
| Example 6 | 180 | 0 | 30 |
| Comparative Example 1 | 140 | 0 | 0 |

TABLE 2

|  | Amount of boron solid-solubilized (wt %) | Iodine adsorption value (mg/g) | Specific surface area ($m^2$/g) | DBP absorption (ml/100 g) | Electrical resistivity (Ωcm) | Volume resistance (Ωcm) | MFi (g/10 min) |
|---|---|---|---|---|---|---|---|
| Ex. 1 | 0.62 | 86 | 62 | 158 | 0.094 | 6.1 | 5.2 |
| Ex. 2 | 0.96 | 52 | 40 | 160 | 0.079 | 7.4 | 7.2 |
| Ex. 3 | 1.98 | 34 | 26 | 105 | 0.080 | 8.9 | 12.9 |
| Ex. 4 | 0.88 | 100 | 70 | 159 | 0.095 | 2.7 | 5.0 |
| Ex. 5 | 0.70 | 35 | 27 | 110 | 0.096 | 9.0 | 10.0 |
| Ex. 6 | 0.97 | 71 | 53 | 155 | 0.079 | 6.6 | 5.9 |
| Comparative Ex. 1 | 0 | 114 | 84 | 158 | 0.237 | 28.0 | 4.5 |
| Reference Ex. 1 | 0.38 | 108 | 75 | 140 | 0.1058 | 16.1 | 4.6 |
| Reference Ex. 2 | — | 307 | 235 | 155 | 0.128 | 11.8 | 3.2 |

It is evident from Table 2 that boron solid-solubilized carbon blacks of the present invention showed far superior electrical conductivities as compared with Comparative Example 1 and Reference Examples 1 and 2, with the electrical resistivity representing the electrical conductivity of the powder itself and the volume resistance of the electrically conductive compositions being low. Further, the boron solid-solubilized carbon blacks of the present invention have small specific surface areas as compared with commercial products, whereby MFi of the electrically conductive compositions is large, and kneading properties with resins are excellent, and it has been found that the operation efficiency at the time of mixing and kneading them to a rubber, a resin or a coating composition, is substantially improved.

the pellet was permitted to absorb moisture at a temperature of 30° C. under a humidity of 90% for two weeks. The moisture absorption was calculated from the mass reduction after drying for two hours at 105° C.

TABLE 3

| Resin | | Ex. 7 LLDPE | Ex. 8 LLDPE | Ex. 9 LDPE | Ex. 10 LDPE | Comp. Ex. 2 LLDPE | Comp. Ex. 3 LDPE | Ref. Ex. 3 LLDPE | Ref. Ex. 3 LDPE |
|---|---|---|---|---|---|---|---|---|---|
| Carbon black | | B solid-solubil-ized AB (Ex. 6) | B solid-solubil-ized AB (Ex. 4) | B solid-solubil-ized AB (Ex. 6) | B solid-solubil-ized AB (Ex. 4) | Vulcan XC72 | Vulcan XC72 | Ketchen EC | Ketchen EC |
| Amount of boron solid-solubilized | (%) | 0.97 | 0.88 | 0.97 | 0.88 | 0 | 0 | 0 | 0 |
| Amount of carbon black incorporated | (parts by weight) | 31 | 26 | 33 | 28 | 45 | 43 | 20 | 20 |
| Iodine adsorption value | (mg/g) | 71 | 100 | 71 | 100 | 300 | 300 | 870 | 870 |
| Electrical resistivity | (Ωcm) | 0.079 | 0.095 | 0.079 | 0.095 | 0.110 | 0.110 | 0.160 | 0.160 |
| Volume resistance | (Ωcm) | 8.7 | 8.7 | 2.5 | 2.5 | 8.6 | 2.5 | 8.7 | 2.5 |
| MFi | (g/10 min) | 3.3 | 3.1 | 4.3 | 4.1 | Did not flow | Did not flow | 0.15 | 0.3 |
| Hygroscopicity | (%) | 0.08 | 0.08 | 0.08 | 0.08 | 0.10 | 0.10 | 0.11 | 0.10 |

Now, it will be exemplified that the resin composition for a cable of the present invention is suitable for forming a protective material for a communication cable.

EXAMPLES 7 to 10, Comparative Examples 2 and 3 and

Reference Examples 3 and 4.

In Examples 7 and 9, the carbon black prepared in Example 6 was used, and in Examples 8 and 10, the carbon black prepared in Example 4 was used. Further, in Comparative Examples 2 and 3 and Reference Examples 3 and 4, commercial products were used. 100 Mass parts of a LDPE (Low Density Polyethylene) resin ("403P", trade name, manufactured by Mitsui Chemicals, Inc.) or a LLDPE (Linear Low Density Polyethylene) resin ("4030P", trade name, manufactured by Mitsui Chemicals, Inc.), carbon black in an amount as identified in Table 3 (parts by weight) and 1 part by weight of a crosslinking agent (dicumyl peroxide, manufactured by Mitsui Chemicals, Inc.) were mixed, and the mixture was kneaded at a temperature of 160° C. for 10 minutes at a blade rotational speed of 30 rpm by a kneading testing machine having an internal capacity of 60 ml ("Laboplastograph R-60", manufactured by Toyo Seiki Seisakusho).

With respect to the resin composition for a cable thus obtained, MFi, the volume resistance and the hygroscopicity were measured. MFi and the volume resistance were measured by the above described measuring methods, and the hygroscopicity was determined by measuring moisture absorption by the following measuring method. The results are shown in Table 3.

(8) Hygroscopicity (moisture absorption): A resin composition for a cable was pressed at a temperature of 180° C. under a pressure of 9.8 MPa for 10 minutes by a heat pressing machine to obtain a pellet of 3×3×3 mm, and then It is evident from Table 3 that the resin compositions for cables (Examples 7 to 10) of the present invention are superior in all of the electrical conductivity, the fluidity and the hygroscopicity to those loaded with conventional carbon blacks (Reference Examples 3 and 4) and those which are outside the scope of the present invention (Comparative Examples 2 and 3). Accordingly, the resin compositions for cables of the present invention were found to be most suitable as protective materials for communication or power cables.

Further, the resin compositions for cables of the present invention have a small content of carbon black, whereby it is possible to form a protective material for a cable having high flexibility.

Now, it will be exemplified that the resin composition for a cable of the present invention is suitable for forming a semiconductor layer for a power cable.

EXAMPLES 11 TO 14, COMPARATIVE EXAMPLES 4 AND 5 AND REFERENCE EXAMPLES 5 AND 6

In Examples 11 and 13, the carbon black prepared in Example 6 was used, and in Examples 12 and 14, the carbon black prepared in Example 4 was used. Further, in Comparative Examples 4 and 5 and Reference Examples 5 and 6, commercial products were used.

100 Mass parts of an EVA resin differing in the ethylene content (each being a commercial product: "3269" or "3145", trade name, manufactured by Nippon Unicar), carbon black in an amount as identified in Table 4 (parts by weight) and 1 part by weight of a crosslinking agent (dicumyl peroxide, manufactured by Mitsui Chemicals, Inc.) were mixed, and the mixture was kneaded at a temperature of 120° C. for 10 minutes at a blade rotational speed of 30 rpm by a kneading testing machine ("Laboplastograph R-60", manufactured by Toyo Seiki Seisakusho) having an internal capacity of 60 ml.

With respect to the obtained resin composition for a cable, MFi, the volume resistance and the hygroscopicity were measured. The measurement of MFi was carried out as described above, and the measurements of the volume resistance and moisture absorption for the hygroscopicity were carried out in the same manner as described above except that the heat pressing temperature was changed to 170° C. The results are shown in Table 4

The resin composition for a cable of the present invention provides flexibility suitable for forming a resin layer for a communication cable or a power cable and yet provides excellent properties such as electrical conductivity and hygroscopicity. Further, it makes it easy to prepare a cable.

TABLE 4

| Resin | | Ex. 11 LLDPE | Ex. 12 LLDPE | Ex. 13 LDPE | Ex. 14 LDPE | Comp. Ex. 4 LLDPE | Comp. Ex. 5 LDPE | Ref. Ex. 5 LLDPE | Ref. Ex. 6 LDPE |
|---|---|---|---|---|---|---|---|---|---|
| Carbon black | | B solid-solubil-ized AB (Ex. 6) | B solid-solubil-ized AB (Ex. 4) | B solid-solubil-ized AB (Ex. 6) | B solid-solubil-ized AB (Ex. 4) | AB parti-cles | AB parti-cles | Vulcan XC72 | Vulcan XC72 |
| Ethylene content of EVA resin | (%) | 72 | 72 | 85 | 85 | 72 | 85 | 72 | 85 |
| Amount of boron solid-solubilized | (%) | 0.97 | 0.88 | 0.97 | 0.88 | 0 | 0 | 0 | 0 |
| Amount of carbon black incorporated | (parts by weight) | 40 | 40 | 40 | 40 | 60 | 60 | 60 | 60 |
| Iodine adsorption value | (mg/g) | 71 | 100 | 71 | 100 | 90 | 90 | 300 | 300 |
| Electrical resistivity | ($\Omega$cm) | 0.079 | 0.095 | 0.079 | 0.095 | 0.19 | 0.19 | 0.11 | 0.11 |
| Volume resistance | ($\Omega$cm) | 25 | 18 | 17 | 11 | 30 | 20 | 25 | 18 |
| MFi | (g/10 min) | 2.5 | 1.8 | 1.3 | 0.9 | 0.10 | Did not flow | 0.11 | Did not flow |
| Hygroscopicity | (%) | 0.05 | 0.06 | 0.05 | 0.06 | 0.08 | 0.08 | 0.10 | 0.10 |

It is evident from Table 4 that the resin compositions of the present invention (Examples 10 to 14) are superior in all of the electrical conductivity, the fluidity and the hygroscopicity to those loaded with conventional carbon blacks (Reference Examples 5 and 6) and those which are outside the scope of the present invention (Comparative Examples 4 and 5). Accordingly, the resin compositions for cables of the present invention were found to be most suitable for semiconductor layers for power cables.

As described in the foregoing, the boron solid-solubilized carbon black of the present invention has a large effect for imparting electrical conductivity and will not increase the viscosity like conventional carbon black with a high specific surface area, even if mixed in a large amount to a rubber, a resin or a coating material. Accordingly, it can be incorporated in a larger amount, whereby it is possible to;present a remarkably highly electrically conductive composition.

According to the method for preparing boron solid-solubilized carbon black of the present invention, it is possible to prepare the above-mentioned boron solid-solubilized carbon black having a large effect for imparting electrical conductivity easily by means of a conventional installation.

According to the electrically conductive composition of the present invention, it is possible to present various resins, rubbers and coating materials excellent in electrical conductivity. The electrically conductive composition of the present invention is effective also for shielding electromagnetic waves.

A cable having a protective material and/or a semiconductor layer formed by means of the resin composition for a cable of the present invention, is easy for its preparation and yet has high flexibility.

The communication cable of the present invention has flexibility and yet is excellent in the properties such as electrical conductivity and hygroscopicity.

The power cable of the present invention has flexibility and yet is excellent in the properties such as electrical conductivity and hygroscopicity, and it is inexpensive.

What is claimed is:

1. Carbon black having boron solid-solubilized therein, which has an electrical resistivity of not higher than 0.1 $\Omega$cm, as measured in accordance with JIS K 1469, wherein the amount of boron solid-solubilized, is from 0.6 to 3.0 wt % and wherein said boron solid-solubilized carbon black is prepared by a thermal decomposition reaction and/or a combustion reaction of a hydrocarbon carried out in the presence of a boron source.

2. A method for preparing carbon black having boron solid-solubilized therein,
    wherein said carbon black has an electrical resistivity of not higher than 0.1 $\Omega$cm, as measured in accordance with JIS K1469, wherein the amount of boron solid-solubilized, is from 0.6 to 3.0 wt %,
    which comprises a thermal decomposition reaction and/or a combustion reaction of a hydrocarbon, wherein the thermal decomposition reaction and/or the combustion reaction is carried out in the presence of a boron source.

3. The method for preparing carbon black having boron solid-solubilized therein according to claim 2, wherein the hydrocarbon is acetylene, and the boron source is an organic boron compound.

4. The carbon black having boron solid-solubilized therein according to claim 1, wherein said carbon black has a specific surface of from 20 to 110 $m^2/g$ and an iodine adsorption value of from 30 to 80 mg/g.

5. A composition comprising carbon black having boron solid-solubilized therein incorporated in a coating material, wherein said carbon black has an electrical resistivity of not higher than 0.1 Ωcm as measured in accordance with JIS K1469, wherein the amount of boron solid-solubilized is from 0.6 to 3.0 wt % and wherein said boron solid-solubilized carbon black is prepared by a thermal decomposition reaction and/or a combustion reaction of a hydrocarbon carried out in the presence of a boron source.

6. A communication cable comprising a conductor, an insulator and a protective material, wherein the protective material is made of a molded product of the composition as defined in claim 5.

7. A power cable comprising a conductor, an inner semiconductor layer, an insulating layer, an outer semiconductor layer, a shielding layer and a protective material, wherein the inner semiconductor layer, the outer semiconductor layer and/or the protective layer is made of a molded product of the composition as defined in claim 5.

8. The composition according to claim 5, wherein said coating material is a polymer, a copolymer, a resin or a rubber.

9. The composition according to claim 8, wherein said polymer is polyester, polybutadiene, chlorosulfonated polyethylene, polyaminobismaleimide, polyimide, polyamidoimide, polyetherimide, polyamide, polyphenylene sulfide, polyphenylene ether, polyarylate, polysulfone, liquid crystal polymer, polyether ketone, polyether sulfone, polycarbonate, polyethylene, polypropylene, polybenzimidazole, polybenzoxazole, polybenzthiazole, polyoxadiazole, polypyrazole, polyquinoxaline, polyquinazolinedione, polybenzoxadinone, polyindolone, polyquinazolone or polyindoxyl.

10. The composition according to claim 8, wherein said copolymer is ethylene-propylene copolymer, ethylene-vinyl acetate copolymer, ethylene-ethylacrylate copolymer or ethylene-butylacrylate copolymer.

11. The composition according to claim 8, wherein said rubber is natural rubber, styrene butadiene rubber, acrylonitrile butadiene rubber, butyl rubber, acrylic rubber, ethylene propylene rubber, a copolymer rubber of ethylene with an α-olefin, silicone rubber, fluorine rubber, chloroprene rubber or hydrin rubber.

12. The composition according to claim 8, wherein said resin is an epoxy resin, a silicone resin, a silicone-epoxy resin, a phenol resin, a melamine resin, a urea resin, a diallyl phthalate resin, a fluorine resin, a maleimide-modified resin, an acrylonitrile/butadiene styrene resin, an acrylonitrile/acryl rubber/styrene resin or an acrylonitrile/ethylene propylene diene rubber/styrene resin.

13. The composition according to claim 5, wherein said carbon black has a specific surface area of from 20 to 110 $m^2/g$ and an iodine adsorption value of from 30 to 80 mg/g.

14. The composition according to claim 10, wherein said carbon black is incorporated in said copolymer in an amount range of from 5 to 100 parts by weight per 100 parts by weight of said coating material.

15. The composition according to claim 10, wherein said carbon black is incorporated in said copolymer in an amount range of from 10 to 80 parts by weight per 100 parts by weight of said copolymer.

* * * * *